US012528515B2

(12) United States Patent
Caldwell et al.

(10) Patent No.: US 12,528,515 B2
(45) Date of Patent: Jan. 20, 2026

(54) TRAJECTORY PLANNING BASED ON TREE SEARCH EXPANSION

(71) Applicant: Zoox, Inc., Foster City, CA (US)

(72) Inventors: Timothy Caldwell, Boulder, CO (US);
Xianan Huang, Foster City, CA (US);
Syed Bilal Mehdi, Newark, CA (US);
Jeremy Schwartz, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 201 days.

(21) Appl. No.: 18/478,813

(22) Filed: Sep. 29, 2023

(65) Prior Publication Data

US 2025/0108839 A1 Apr. 3, 2025

(51) Int. Cl.
*B60W 60/00* (2020.01)
*G06N 5/022* (2023.01)

(52) U.S. Cl.
CPC ......... *B60W 60/0027* (2020.02); *G06N 5/022* (2013.01); *B60W 2554/4045* (2020.02)

(58) Field of Classification Search
CPC ..... B60W 60/0027; B60W 2554/4045; B60W 60/0011; G06N 5/022; G06N 5/01
See application file for complete search history.

(56) References Cited

U.S. PATENT DOCUMENTS

| 7,124,180 B1* | 10/2006 | Ranous | H04L 12/4633 |
| | | | 709/224 |
| 2021/0046924 A1* | 2/2021 | Caldwell | B60W 30/09 |
| 2022/0250641 A1* | 8/2022 | Seegmiller | B60W 30/18163 |
| 2023/0041975 A1* | 2/2023 | Caldwell | B60W 60/0027 |
| 2025/0053179 A1* | 2/2025 | Higa | G05D 1/6987 |

FOREIGN PATENT DOCUMENTS

| EP | 1623347 B1 | 10/2018 |
| KR | 20060118237 A | 11/2006 |
| WO | WO2014150593 A1 | 9/2014 |

OTHER PUBLICATIONS

Search Report and Written Opinion for International Application No. PCT/US2024/048314, Dated Jan. 3, 2025, 12 pages.

* cited by examiner

*Primary Examiner* — Peter D Nolan
(74) *Attorney, Agent, or Firm* — Lee & Hayes, P.C.

(57) ABSTRACT

Techniques for determining a vehicle trajectory that causes a vehicle to navigate in an environment relative to one or more objects are described herein. In some cases, the techniques described herein relate to selectively expanding a tree structure (e.g., a decision tree structure) to efficiently search for simulation data that can be used to evaluate vehicle control trajectories. The tree structure may include state nodes representing observed and/or predicted environment states, and action nodes representing candidate actions the vehicle may take. By selectively and incrementally expanding the tree using estimated state transition probabilities to focus on higher likelihood scenarios, more optimal trajectories can be determined without exhaustively evaluating every possible outcome.

19 Claims, 5 Drawing Sheets

TRAJECTORY PLANNING BASED ON TREE SEARCH EXPANSION

BACKGROUND

Simulation models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future object trajectories may be used to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
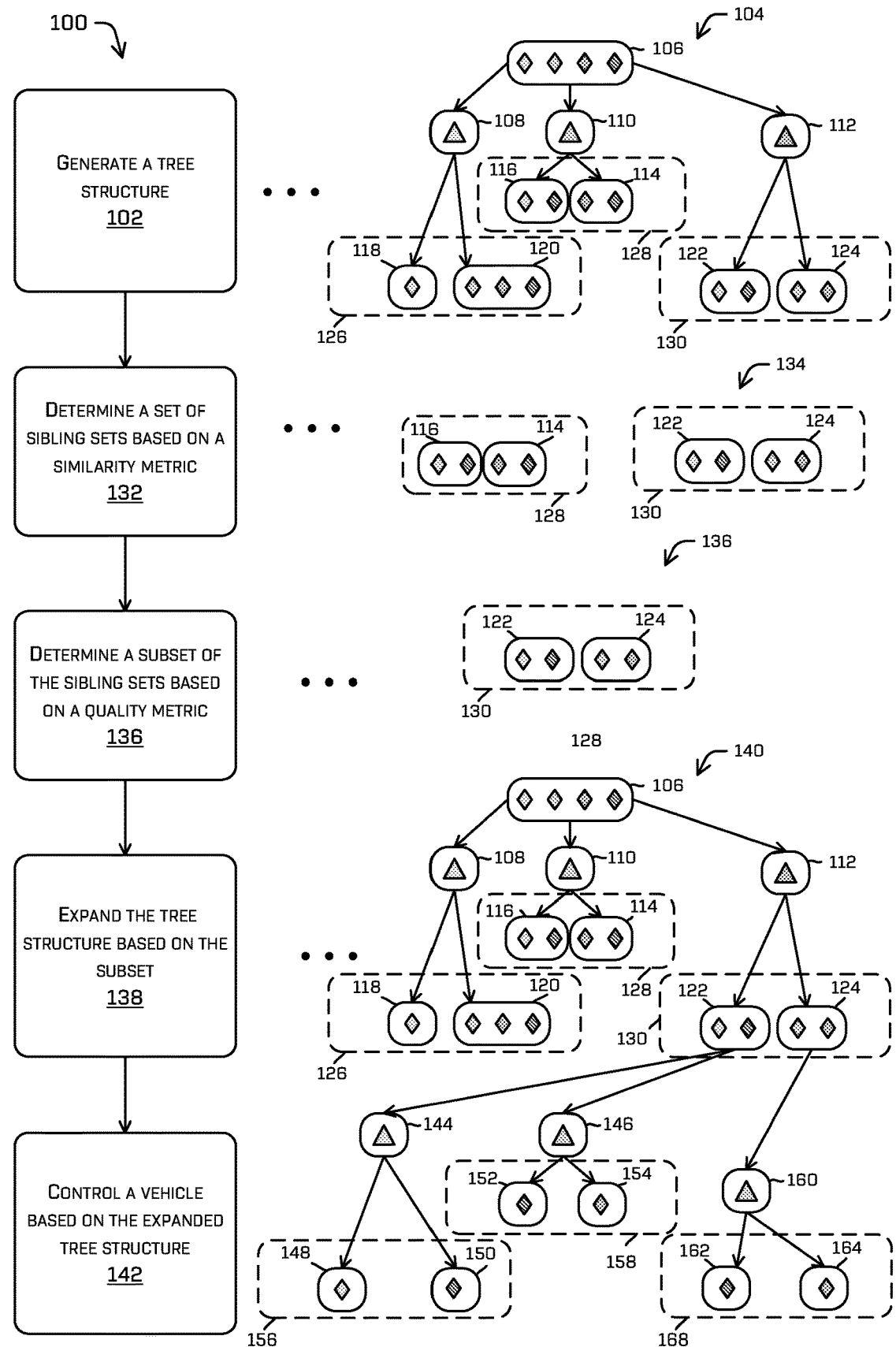
FIG. 1 is a flowchart diagram of an example process for controlling a vehicle based on a selectively expanded tree structure.

This document describes techniques for determining a vehicle trajectory that causes a vehicle to navigate in an environment relative to one or more objects. In some cases, the techniques described herein relate to selectively expanding a tree structure (e.g., a decision tree structure) to efficiently search for data that can be used to evaluate vehicle control trajectories. The tree structure may include state nodes representing observed and/or predicted environment states, and action nodes representing candidate actions the vehicle may take. By selectively and incrementally expanding the tree using estimated state transition probabilities to focus on higher likelihood scenarios, more optimal trajectories can be determined without exhaustively evaluating every possible outcome. Additionally or alternatively, more computational resources may be dedicated to those nodes selected for expansion which may, in some instances, yield more accurate predictions and safer traversals. The selective expansion balances detailed exploration of relevant branches with purposeful pruning of redundant scenarios. This allows the vehicle to quickly plan safe and smooth trajectories through complex environments by concentrating computation on the most informative future scenarios. Accordingly, the techniques discussed herein may improve the safety of occupants of an autonomous vehicle that incorporates the techniques discussed herein. Moreover, the techniques may improve the efficiency of vehicle, such as an autonomous vehicle, in accomplishing a mission such as, for example, delivering passengers and/or cargo, surveying a region, or the like.

In some cases, the techniques described herein relate to a tree structure (e.g., a decision tree structure) with two types of nodes: state nodes and action nodes. An edge from a state node to an action node may represent that an action associated with the action node is performed (e.g., by a vehicle) while the environment of a vehicle corresponds to a state associated with the state node. An edge from an action node may represent that performing an action associated with the action node is predicted to result in a state associated with the state node. For example, the root node of the tree structure may represent the current state of a vehicle's environment. The root node may be connected to a set of action nodes, each corresponding to an action that may be performed by the vehicle in the current state. The action nodes may in turn be connected to predicted state nodes, each corresponding to a state of the environment that is predicted to result from performing an action. For example, the tree structure may represent that a first action may result to one of two potential predicted states (e.g., each with a computed probability of occurrence). Of course, this is one of several implementations and the disclosure is not meant to be so limiting. As an alternate or additional example, edges may be associated with actions such that a single type of node (e.g., state prediction or measurement) is used in the tree structure.

In some cases, the tree structure may be used to model sequential decision making for a vehicle navigating a dynamic environment. The root node of the tree structure may represent the vehicle's current environmental state (e.g., as determined based on the vehicle's sensor inputs). For example, the current environmental state may represent observed positions of other vehicles, pedestrians, traffic signals, and/or the like. In some cases, the action nodes connected to the root node capture possible actions the vehicle could perform in the current state. For example, action nodes may correspond to changing lanes, turning, accelerating, braking, and/or the like. Each action node may be connected to one or more predicted state nodes that model the potential outcomes of taking that action.

For example, if the vehicle is currently behind a slow lead vehicle, action nodes may correspond to maintaining current speed, braking, or changing lanes. The predicted state nodes may represent the different scenarios that may result from performing such actions. For example, a predicted state node may represent that, if the vehicle maintains current speed, the lead vehicle may remain close ahead. In some cases, the predicted state nodes resulting from a single action node may represent the uncertainty in potential outcomes. For example, predicted state nodes resulting from the action of changing lanes may represent that other vehicles in the target lane may accommodate and slow down or may fail to see the vehicle and not react. In some cases, each of those scenarios is associated with a corresponding predicted state node or nodes. In some cases, each predicted state node and/or each predicted scenario is associated with a computed probability of occurrence.

In some cases, the tree structure enables a system (e.g., the vehicle's computing device or a remote server that communicates with the vehicle) to simulate different action sequences and resulting states to generate an optimal trajectory for the validate. The tree structure may be expanded to determine predicted states in the future resulting from different sequences of actions. The predicted states may then be used to determine costs for different trajectories that are available to the vehicle. In some cases, based on those determined costs, an optimal trajectory for controlling the vehicle may be selected. In some cases, determining a trajectory for a vehicle based on simulations performed using expansions of a tree structure (e.g., a decision tree structure) may be performed using techniques that are described in U.S. patent application Ser. No. 18/084,419, entitled "Machine-Learned Cost Estimation in Tree Search Trajectory Generation for Vehicle Control" and filed on Dec. 19, 2022 and U.S. patent application Ser. No. 17/900,658, entitled "Trajectory Prediction Based on a Decision Tree" and filed on Aug. 31, 2022, both of which are incorporated by reference herein in their entireties and for all purposes.

In some cases, the techniques discussed herein may include a vehicle guidance system that generates a path for controlling an autonomous vehicle based at least in part on a tree search technique that alternately determines a candidate action and predicts a future state of the environment, dynamic object(s), and the autonomous vehicle responsive to the candidate action. The tree search may use a cost function to determine a cost associated with a predicted state and/or candidate action. In some examples, determining the cost using the cost function may include simulating future states of dynamic object(s) and/or the environment, which may be time consuming and computationally intensive. For example, to determine a first predicted state to further explore (to assess whether candidate action(s) to get to or from that state are feasible), cost(s) associated with a series of action(s) and/or predicted state(s) before and/or after that predicted state may be determined until an endpoint is reached, such as a horizon time along a route, to determine the cost associated with that first predicted state. This portion of the tree search may represent 40% or more of the latency of the tree search.

The tree search discussed herein may alternately determine a candidate action and a predicted state of the environment associated with (e.g., at least partially responsive to) the candidate action at a future time step, another candidate action based on the predicted state of the environment, a second predicted state of the environment associated with the additional candidate action at a further future time step, and so on, up to a time horizon or a specified number of actions. A candidate action may indicate, for example, a trajectory for controlling motion of the vehicle, activating emitters of the vehicle (e.g., a turn signal, a headlight, a speaker), and/or the like. Each candidate action may be associated with a different action node and each predicted environment state may be associated with a prediction node of the tree.

As an initial operation, the tree search may determine, based at least in part on sensor data, the current state of an environment associated with the autonomous vehicle, which may include dynamic objects and/or static objects. This initial state may be associated with a root node. The root node may be a prediction node, in at least one example. The state of the environment may be indicated by a data structure associated with the root node/prediction node, in some examples. Using this initial state, the tree search may determine one or more candidate actions for exploration. A candidate action may comprise a coarse maneuver, such as "stay in same lane," "lane change left," "execute right turn," "stop," or the like; and/or fine instructions such as a curve that defines and/or is associated with a position, steering angle, steering rate, velocity, and/or acceleration for the vehicle controller to track. In some examples, determining the one or more candidate actions for exploration may comprise transmitting the initial environment state (or the state that is indicated by a particular prediction node of a branch that is being explored at predictions nodes deeper than the initial node) to the planning component of the vehicle and receiving the set of candidate actions from the planning component. The planning component may be a nominal planning component of the vehicle that generates one or more trajectories for controlling motion and/or operation of the vehicle in contrast to a contingent planning component that controls the vehicle during aberrant or emergency situations, although it is contemplated that a contingent planning component may additionally or alternatively provide generate candidate action(s) for use by the tree search. A tree search component may associate the one or more candidate actions of the set received from the planning component with action nodes. The actions may correspond to predetermined candidate trajectories available to the vehicle at a current and/or simulated future time.

In some cases, the set of predicted states that are predicted to result from performing an action that is associated with an action node is referred to herein as the sibling state set associated with the action. For example, if a tree structure represents that performing an action A1 at a current state results in one of states S1 and S2 and performing an action A2 at the current state results in one of states S3, S4, and S5, then S1 and S2 correspond to a first sibling state set and S3, S4, and S5 correspond to a second sibling state set. In some cases, the tree structure may associate each state sibling set with a probability distribution that assigns an occurrence probability to each state in the state sibling set.

In some cases, a state (e.g., the current state and/or a predicted future state) represented by a tree structure is associated with one or more state samples. A state sample may be a snapshot of an environment (e.g., a snapshot of the current environment or a snapshot of a predicted future environment) that contains sufficient data to perform a simulation with respect to the environment. For example, a first state may be associated with a first state sample that represents data (e.g., position, velocity, and/or acceleration) associated with a first object (e.g., a reactive entity, such as a vehicle), a second state sample that represents data associated with a second object (e.g., a nominal entity), and a third state sample that represents data associated with a third object (e.g., an inattentive entity).

Accordingly, in some cases, each action node may be downstream from a state node and may be downstream to one or more state nodes. The set of state nodes that are downstream from an action node may be referred to as the sibling state set associated with the action node. Moreover, each state node may be associated with one or more state samples. In some cases, the number of state samples associated with a state node may represent a count of objects that are determined to be relevant to trajectory cost evaluation at the corresponding state.

In some cases, the techniques described herein relate to techniques for selective expansion of a tree structure corresponding to environment states and/or actions associated with a vehicle's environment. In some cases, the tree structure may be expanded to determine the range of potential future states that may result from the vehicle performing different action sequences. Accordingly, each expansion may capture predictions about how the environment is predicted to evolve over a timestep and under one or more different action selections. In some cases, tree structure can quickly grow very large as additional actions and states are explored. To manage the computational costs, the expansion may be focused on some tree branches (e.g., the most promising branches, the least redundant branches given branches that have already been expanded, etc.). Accordingly, in some cases, the tree structure may be selectively expanded by prioritizing exploration of higher quality and/or most informative branches, thus reducing the computational costs associated with tree search.

In some cases, to selectively expand a tree structure, an example system may first determine two or more state nodes (e.g., two or more leaf state nodes) of the tree structure that are similar. Two state nodes may be determined to be similar if they have a similar number of state samples and/or have state samples whose respective object state(s) are similar. Subsequently, the system may determine a subset of those similar state nodes to expand and refrains from expanding the remaining subset. For example, the system may determine that a first state and a second state are similar, determine that the first state has a higher quality (e.g., is more promising, is associated with more information gain with respect to already-expanded states, is associated with an action that is in greater alignment with a vehicle policy, and/or the) than the second state, expand the node corresponding to the first state, and refrain from expanding the node corresponding to the second state. As another example, the system may determine that a first state sibling set associated with a first action is similar to a state sibling set associated with a second action, determine that the first state sibling set has a higher quality (e.g., is more promising) than the second state sibling set, expand the state nodes associated with the first state sibling set, and refrain from expanding the state nodes associated with the second state sibling set.

In some cases, the system may first determine that the leaf state nodes of the tree structure belong to N state sibling sets. Subsequently, the system may determine $N*(N-1)/2$ pairs of state sibling sets from the N leaf-level sets and assign each of those pairs to one of $N*(N-1)/2$ parallel processes. For example, the system may assign a pair including an ith state sibling set and a jth state sibling set to the t(i,j)th process, where t(i,j)th process may be determined using the equation $t(i,j)=j*(j-1)/2+i$. In some cases, the tth process can be assigned to the pair (i, j), where j may be determined using the equation j=floor (J) where $J^2-J-2t=0$ and i may be determined using the equation $i=t-j*(j-1)/2$. After the pairs of state sibling sets are assigned to their respective processes, those processes may be executed in parallel to determine which pairs include similar state sibling sets.

In some cases, to determine whether a first state sibling set and a second state sibling set are similar, the system uses at least one of the following: (i) the counts of states associated with each of the two state sibling sets, (ii) the counts of state samples associated with each of the two state sibling sets, or (iii) the degree of similarity between the state samples of the first state sibling set and the state samples of the second state sibling set. For example, in some cases, if the count of states associated with the first state sibling set and the count of states associated with the second state sibling set exceed by more than a threshold amount (e.g., if the two counts are not equal), then the system determines that the two state sibling sets are not similar. As another example, in some cases, if the count of state samples associated with the first state sibling set and the count of state samples associated with the second state sibling set exceed by more than a threshold amount (e.g., if the two counts are not equal), then the system determines that the two state sibling sets are not similar. A state sample may represent data about an object that is relevant to assessing trajectory costs, such as position, velocity, object type, and/or object intent of the object. In some cases, a state sample may represent an intent of an object in the vehicle environment (e.g., an intent for each object in the vehicle environment), such as whether the object is reactive and/or non-reactive. In some cases, if a state is associated with multiple state samples, the different state samples are determined to be similar (e.g., a threshold subset of object states represented by the multiple state samples are the same). In some cases, if a state is associated with multiple state samples, the different state samples are determined to be similar such that the deviations between those state samples does not affect the outcome of simulations performed with respect to those state samples based on different candidate actions. For example, if the deviations between two state samples represent differences between intents of objects that are far away from the vehicle, the two state samples may be grouped into a state.

In some cases, the system determines whether a first state sibling set and a second sibling set are similar based on the set of counts of state samples associated with the states of the two state sibling sets. In some cases, if the number of state samples associated with the states of two state sibling sets are different by more than a threshold amount (e.g., are not equal), the system determines that the two state sibling sets are not similar. For example, if a first state sibling set includes a first state with one state sample and a second state with four state samples, and if a second state sibling set includes a third state with two state samples and a fourth state with two state samples, the system may determine that the two state sibling sets are not similar.

In some cases, the system determines that a first state sibling set and a second sibling set if: (i) the two state sibling sets include a similar (e.g., an equal) number of states, (ii) the states associated with the two state sibling sets include a similar (e.g., an equal) number of state samples, and (iii) a measure of similarity associated with the state samples of the first state sibling set and the states samples of the state sibling set exceeds a threshold. In some cases, the measure of similarity may be determined based on object types associated with the state samples. In some cases, the system may determine similarity between two state sibling sets by comparing the state samples associated with the states of the two sibling sets. For example, the system may compare the object types represented in the state samples of the first state sibling set to the object types represented in the state samples of the second state sibling set. In some cases, each state sample may be associated with metadata indicating one or more object types (e.g., vehicle, pedestrian, bicycle, unknown, and/or the like) represented by the state sample.

In some cases, the system may compare the object type metadata of the state samples associated with the first state sibling set to the object type metadata of the state samples associated with the second state sibling set. For example, the system may determine a first set of object types associated with the first state sibling set based on the object type metadata of the state samples of the first state sibling set. The system may also determine a second set of object types associated with the second state sibling set. In some cases, the system may consider two state sibling sets to be similar if the two state sibling sets are associated with a common set of object types and the counts of object types in the two state sibling sets are within a threshold percentage of each other. For example, if one state sibling set has 10 vehicle objects, 15 pedestrian objects, and 5 bicycle objects and the other state sibling set has 11 vehicle objects, 16 pedestrian objects, and 4 bicycle objects, the system may still consider the two state sibling sets to be similar since the object types match and the counts are within a threshold percentage of each other (e.g., within a 10% deviation).

In some cases, determining whether two state sibling sets are similar may be based on comparing geometric properties of objects represented in the state samples. For example, each state sample may contain data representing position, velocity, acceleration, orientation, shape, and/or dimensions of objects. The system may compare these geometric properties between the state samples of the first state sibling set and the state samples of the second state sibling set. In some cases, if the geometric properties of objects fall within certain thresholds, the system may consider the state sibling sets to be similar. For example, if vehicles represented in the state samples of both sibling sets have positions within a few meters of each other and dimensions within a few centimeters (or as otherwise specified), and pedestrians in both sets have positions within a threshold distance, the system may determine the geometric properties match closely enough for the state sibling sets to be considered similar.

In some cases, determining similarity between state sibling sets may additionally or alternatively be based on comparing semantic labels associated with the state samples. For example, a state sample may have an associated semantic label categorizing the scene represented by the state sample, such as "four-way intersection," "roundabout," "crosswalk," and/or the like. The system may compare the semantic labels applied to the state samples of the first state sibling set to the semantic labels applied to the state samples of the second state sibling set. If the semantic labels match between the state sibling sets, or match within a certain threshold, the system may determine the two state sibling sets are similar. For example, if a state sample from each of the two state sibling sets is labeled as "four-way intersection," the sets may be determined to be similar based on the matching semantic classification.

In some cases, the techniques described herein relate to determining the quality score associated with a state. In some cases, an example system determines the quality score associated with a state based on at least one of: an estimate of a cost associated with traversing a trajectory from the state, an estimate of a number of states resulting from expanding tree structure from the state, or a measure of deviation between the action associated with the state and a policy associated with the vehicle.

In some cases, an estimate of the cost associated with traversing a trajectory from a state is determined using one or more heuristics. For example, given a state, the distance along various candidate trajectories to the target location may be computed geometrically. States estimated to be closer to the target location when following available trajectories are estimated to be associated with lower costs. Thus, proximity heuristics may be used to determine traversal costs used to determine quality scores for states. In some cases, states along trajectories with tighter turns, narrower lanes, and/or areas known to have higher pedestrian traffic are determined to be associated with higher costs. In some cases, an estimate of the cost associated with traversing a trajectory from a state is determined using at least one of the following: (i) using a cost function to determine a cost associated with a state, or (ii) by using the predicted state data resulting from a partial expansion of the tree structure starting from state. In some cases, determining the estimate using the cost function is performed using the operations described in U.S. patent application Ser. No. 18/084,419, entitled "Machine Learned Cost Estimation in Tree Search Trajectory Generation for Vehicle Control," and filed on Dec. 19, 2022, which is incorporated herein in its entirety and for all purposes.

In some cases, an estimate of the number of states resulting from expanding tree structure from a state is determined based on the dimensionality of the state space and amount of variability in each dimension. For example, the system may determine that states with more possible headings the vehicle may take inherently have more potential future trajectories. As another example, the system may determine that states with more possible actions available, such as lane changes or turning, expand into more child states. Additionally, the system may determine an estimate of the number of states resulting from a particular expansion based on properties of dynamic agents present in the corresponding state. For example, states with more surrounding vehicles that may plausibly interact with a vehicle likely lead to higher branching factors.

In some cases, the system may use the amount of deviation between a candidate action associated with a state and the vehicle's baseline policy to determine how much expanding the tree structure to explore the state may reveal new useful behaviors. In some cases, if a candidate action violates the baseline policy, the system may reduce the quality score associated with a state that results from that action, in order to reduce the likelihood that the state is used for tree structure expansion. In some cases, the system may determine the amount of deviation between a candidate action associated with a state and the vehicle's baseline policy based on traffic rules, safety margins, ride comfort, and/or the like. In some cases, the amount of deviation between a candidate action associated with a state and the vehicle's baseline policy may be measured by factors like magnitude of difference in acceleration and/or steering between following the candidate action and following the baseline policy.

In some cases, after determining which pairs of state sibling sets are similar, the system may analyze the quality or cost values associated with the state sibling sets in each similar pair. For each similar pair, the system may identify the state sibling set with the higher quality value. The system may then select the higher quality state sibling set from each pair for expansion and remove the lower quality set as a candidate for expansion. The system may also mark the selected set as unremovable from the set of candidates for expansion.

For example, if state sibling set A and state sibling set B are determined to be similar, but state sibling set A has a higher quality value, the system may select state sibling set A for expansion and refrain from expanding state sibling set B. This allows the tree search to be selectively focused on higher quality parts of the tree without exhaustively expanding lower quality branches that may be redundant or less promising for identifying a useful trajectory. By expanding the tree in a selective manner focused on higher quality state spaces, the overall complexity of operations performed to expand the tree data structure and the size of the resulting structure may be reduced compared to exhaustively expanding all branches. Accordingly, in some cases, the techniques described herein reduce memory usage and computational costs.

In some cases, after determining that a set of state sibling sets are similar, the example system performs the following operations: (i) for each pair of state sibling sets including two similar sets, determine which set in the pair has a higher quality score and mark that set as "not removable," and (ii) expand the tree structure using all state sibling sets that are marked "not removable." For example, consider a scenario in which state sibling sets A, B, C, D, and E are found to be similar. If the ranking of quality scores is A>B>C>D>E, then the following operations may be performed: comparing A vs B, after which A is marked as "not removable;" comparing A vs C, after which A is marked as "not removable;" comparing A vs D, after which A is marked as "not removable;" comparing A vs E, after which A is marked as "not removable;" comparing B vs C, after which B is marked as "not removable;" comparing B vs D, after which B is marked as "not removable;" comparing B vs E, after which B is marked as "not removable;" comparing C vs D, after which D is marked as "not removable;" comparing C vs E, after which C is marked as "not removable;" and comparing D vs E, after which D is marked as "not removable." Accordingly, only E is discarded, and A-D are used for expansion, as those sets are marked as "not removable."

In some cases, after determining that a set of state sibling sets are similar, the example system uses a directed graph (e.g., a directed acyclic graph) to determine a subset of the similar sets for expansion. The graph may represent order relationships between sibling sets (e.g., order relationships between qualities and/or quality scores of sibling sets). In some cases, in the directed graph, each node corresponds to one of the similar state sibling sets, while an edge from the node associated with a first set to the node associated with a second set represents that the second set has a lower quality score relative to the first set. In some cases, if the graph has one or more sink nodes that have at least one incoming edge, the system may iteratively select each sink node and remove the sink node. In some cases, after removing each sink node, the system may select one of the nodes that had an edge pointing to the sink node just removed and mark that node as "not removable." After all sink nodes are removed, tree expansion may be performed using state sibling sets whose nodes in the graph were (i) marked as not removable or (ii) were left with no incoming edges.

For example, consider a scenario where a sibling set A is determined to be similar to the sibling set B and C and with a higher quality score relative to the quality scores of those sets, B is determined to be similar to the sibling sets D and E and with a higher quality score relative to the quality scores of those sets, and C is determined to be similar to E but with a higher quality score relative to the quality score of E. Accordingly, the corresponding graph may have directed edges pointing from A to B, A to C, B to D, B to E, and C to E. In some cases, to select which sibling sets to expand, the graph is iteratively reduced by removing sink nodes (e.g., those with only incoming edges). For example, E may be first be removed as a sink node and one of B or C may then be marked as "not removable" because of the directed edge from B to E and from C to E. Next, D may be removed as a sink node and B may be marked as not removable because of the directed edge from B to D.

In some cases, the techniques described herein can be used for determining which state sibling sets to expand and/or for determining which states to expand during tree search. In some cases, similar state sibling sets are determined, and quality scores associated with those sets are used to determine which sets to expand. In some cases, similar states are determined, and quality associated with those states are used to determine which states to expand. The selective tree expansion techniques described can thus be used at various granularities to focus expansion on different regions and/or branches of the tree structure. In some cases, the techniques described herein can be used to selectively expand particular states within a state sibling set (e.g., within a state sibling set selected using a selective expansion technique). For example, in some cases, the system may determine that the sibling set A is similar to the sibling set B and has a higher quality score, select A for expansion, and refrain from expanding B. Afterward, the system may determine that, among the states associated with A, state A1 is similar to the state A2 and has a higher quality score, select A1 for expansion, and refrain from expanding A2.

In some cases, the techniques discussed herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques described herein reduce computational costs and memory usage associated with decision tree expansion. In some cases, the techniques described herein enable selective expansion of a tree structure used for trajectory planning and vehicle control. By selectively expanding the tree via focusing on higher quality branches, the system can reduce computational costs and memory usage compared to exhaustively expanding the full tree. This also enables the tree search method to scale more efficiently and/or with lower latency. In some cases, comparing the properties of different sibling sets that result from actions in a parent state, redundant expansions can be avoided. In some cases, coly sibling sets that are sufficiently distinct are expanded. This may prevent expanding redundant states that would not provide significant new information. Additionally or alternatively, the preserved computational resources may be reallocated to further improve the search over remaining nodes (e.g., longer time horizons over the tree search, exploring additional actions, or the like).

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using trajectory planning techniques and are not limited to vehicles. Moreover, although various trajectory planning operations are described as being performed by a planning component of a vehicle computing device, a person of ordinary skill in the relevant technology will recognize that the planning component may be deployed on other computing devices, such as on a remote computing device that communicates with a vehicle computing device using a networked connection.

FIG. 1 is a flowchart diagram of an example process 100 for controlling a vehicle based on a selectively-expanded tree structure. As depicted in FIG. 1, at operation 102, an example system generates a tree structure. An operational example of a tree structure is the tree structure 104. As depicted, the tree structure 104 includes the root node 106, action nodes 108, 110, and 112, and predicted state nodes 118, 120, 122, and 124.

The tree structure 104 of FIG. 1 represents that performing an action corresponding to the action node 108 while the vehicle is at a state defined by the root node 106 is predicted to result in one of two predicted states: the predicted state associated with the predicted state node 118 and the predicted state associated with the predicted state node 120. As depicted, the predicted state node 118 is associated with a single state sample, while the predicted state node 120 is associated with three state samples. Moreover, because the predicted state node 118 and the predicted state associated with the predicted state node 120 both result from the action node 108, they are part of the state sibling set 126.

Additionally, the tree structure 104 of FIG. 1 represents that performing an action corresponding to the action node 110 while the vehicle is at the state defined by the root node 106 is predicted to result in one of two predicted states: the predicted state associated with the predicted state node 114 and the predicted state associated with the predicted state node 116. Each predicted state node may represent a set of one or more state samples that are determined to be similar such that the differences between the state samples does not affect the outcome of simulations performed across those state samples given different actions. Each state sample may represent a feature (e.g., a predicted intent classification) associated with an object in the vehicle environment. For example, two state samples associated with a particular future time may be part of the same predicted state node if: (i) the first sample represents a prediction that a first object is reactive, a second object is non-reactive, and a third object is non-reactive at the particular future time, (ii) the second sample represents a prediction that the first object is reactive, the second object is non-reactive, and the third object is reactive at the particular future time, and (iii) the third object is predicted to be at a location at the particular future time that makes the third object's reactive or non-reactive intent insignificant to predicting the state resulting from performing a set of candidate actions at the particular future time.

As depicted, both the predicted state node 114 and the predicted state associated with the predicted state node 116 are associated with two state samples. Moreover, because the predicted state node 114 and the predicted state associated with the predicted state node 116 both result from the action node 110, they are part of the state sibling set 128.

Furthermore, the tree structure 104 of FIG. 1 represents that performing an action corresponding to the action node 112 while the vehicle is at the state defined by the root node 106 is predicted to result in one of two predicted states: the predicted state associated with the predicted state node 122 and the predicted state associated with the predicted state node 124. As depicted, both the predicted state node 122 and the predicted state associated with the predicted state node 124 are associated with two state samples. Moreover, because the predicted state node 122 and the predicted state associated with the predicted state node 124 both result from the action node 112, they are part of the state sibling set 130.

As further depicted in FIG. 1, at operation 132, the system determines a set of sibling sets based on a similarity metric. For example, the system may determine a similarity metric for each pair of sibling sets and determine that a pair is similar if the corresponding similarity score exceeds a threshold. The determination whether a first state sibling set and a second state sibling set are similar may be based on at least one of the following: (i) the counts of states associated with each of the two state sibling sets, (ii) the counts of state samples associated with each of the two state sibling sets, or (iii) the degree of similarity between the state samples of the first state sibling set and the state samples of the second state sibling set. Of course, additional metrics are contemplated for determining how similar one or more states or state samples are.

In the operational example depicted in FIG. 1, the system has determined the set 134 that includes the state sibling set 128 and the state sibling set 130 based on a similarity metric. This determination may be based on at least one of the following determinations: (i) that the state sibling set 126 is not similar to the state sibling set 128 because the state sibling set 126 includes a state with one state sample and a state with three state samples while the state sibling set 128 includes two states each with two state samples, (ii) that the state sibling set 126 is not similar to the state sibling set 130 because the state sibling set 126 includes a state with one state sample and a state with three state samples while the state sibling set 130 includes two states each with two state samples, or (iii) that the sibling set 128 may be similar to the state sibling set 130 because both sets include two states each with two state samples. In some cases, the system determines that the sibling set 128 is similar to the state sibling set 130 based on a measure of similarity of the four state samples associated with the state sibling set 128 and the four state samples associated with the state sibling set 130.

At operation 136, the system determines a subset of the set determined at operation 132 based on a quality metric. In some cases, after determining a set of state sibling sets based on a similarity metric, the system may select a subset of that set based on quality metrics associated with the similar sibling sets. For example, after determining that a first state sibling set and a second state sibling set are similar (e.g., after determining that a similarity score associated with the two sets exceeds a threshold), the system may determine that the quality score associated with the first set exceeds the quality score associated with the second set. The system may then select the first set for expansion of the tree structure. As will be discussed herein, such a quality score may be associated with a lower cost for traversing one node relative to the other.

As depicted in FIG. 1, the system has selected, based on the quality metric, the state sibling set 130 from the set of state sibling sets 134 that includes the state sibling set 128 and the state sibling set 130. In some cases, this selection includes determining a first quality score for the state sibling set 128, determining a second quality score for the state sibling set 130, and determining that the second quality score exceeds the first quality score.

At operation 138, the system expands the tree structure based on the subset determined at operation 136. In some cases, after determining a set of similar sibling state sets, the system determines a subset of that set based on a quality metric. The system may then expand the states in the determined subset and refrain from expanding the remaining subset. For example, after determining that a first state sibling set and a second state sibling set are similar (e.g., after determining that a similarity score associated with the two sets exceeds a threshold), the system may determine that the quality score associated with the first set exceeds the quality score associated with the second set. The system may then select the first set for expansion of the tree structure and refrain from expansion of the second set.

As depicted in FIG. 1, the system has expanded the state sibling set 130. To do so, the system may determine two actions that are available at the state associated with the state node 122: the action associated with the action node 144 and the action associated with the action node 146. The system may also determine one action that is available at the state associated with the state node 124: the action associated with the action node 160.

FIG. 1 depicts the expanded the expanded tree structure 140 that represents that performing an action corresponding to the action node 144 while the vehicle is at the state defined by the node 122 is predicted to result in one of two predicted states: the predicted state associated with the predicted state node 148 and the predicted state associated with the predicted state node 150. As depicted, the predicted state node 148 is associated with one state sample and the predicted state associated with the predicted state node 150 are associated with three state samples. Moreover, because the predicted state node 148 and the predicted state associated with the predicted state node 150 both result from the action node 144, they are part of the state sibling set 156.

The expanded the expanded tree structure 140 further represents that performing an action corresponding to the action node 146 while the vehicle is at the state defined by the node 122 is predicted to result in one of two predicted states: the predicted state associated with the predicted state node 152 and the predicted state associated with the predicted state node 154. As depicted, both the predicted state node 152 and the predicted state node 154 are associated with two state samples. Moreover, because the predicted state node 152 and the predicted state associated with the predicted state node 154 both result from the action node 146, they are part of the state sibling set 158.

The expanded the expanded tree structure 140 further represents that performing an action corresponding to the action node 160 while the vehicle is at the state defined by the node 124 is predicted to result in one of two predicted states: the predicted state associated with the predicted state node 162 and the predicted state associated with the predicted state node 164. As depicted, both the predicted state node 162 and the predicted state node 164 are associated with two state samples. Moreover, because the predicted state node 162 and the predicted state associated with the predicted state node 164 both result from the action node 160, they are part of the state sibling set 168.

In some cases, the selective expansion of the tree structure may be iteratively continued until a stopping condition is reached. For example, the system may continue expanding the tree by exploring the next highest quality state sibling sets until a set maximum tree depth is reached. As another example, the system may continue expansion until a solution trajectory with a cost meeting specified criteria is discovered or otherwise determined. Additionally, the system may stop expanding the tree after a certain amount of computation time has elapsed.

At operation 142, the system controls the vehicle based on the expanded tree structure. In some cases, after the tree structure is expanded until the stopping condition is reached, the resulting structure is used to determine costs for one or more candidate trajectories. Afterward, a trajectory may be selected and/or determined based on the determined costs and the selected trajectory may be used to control the operation of the vehicle.

Figure 2:
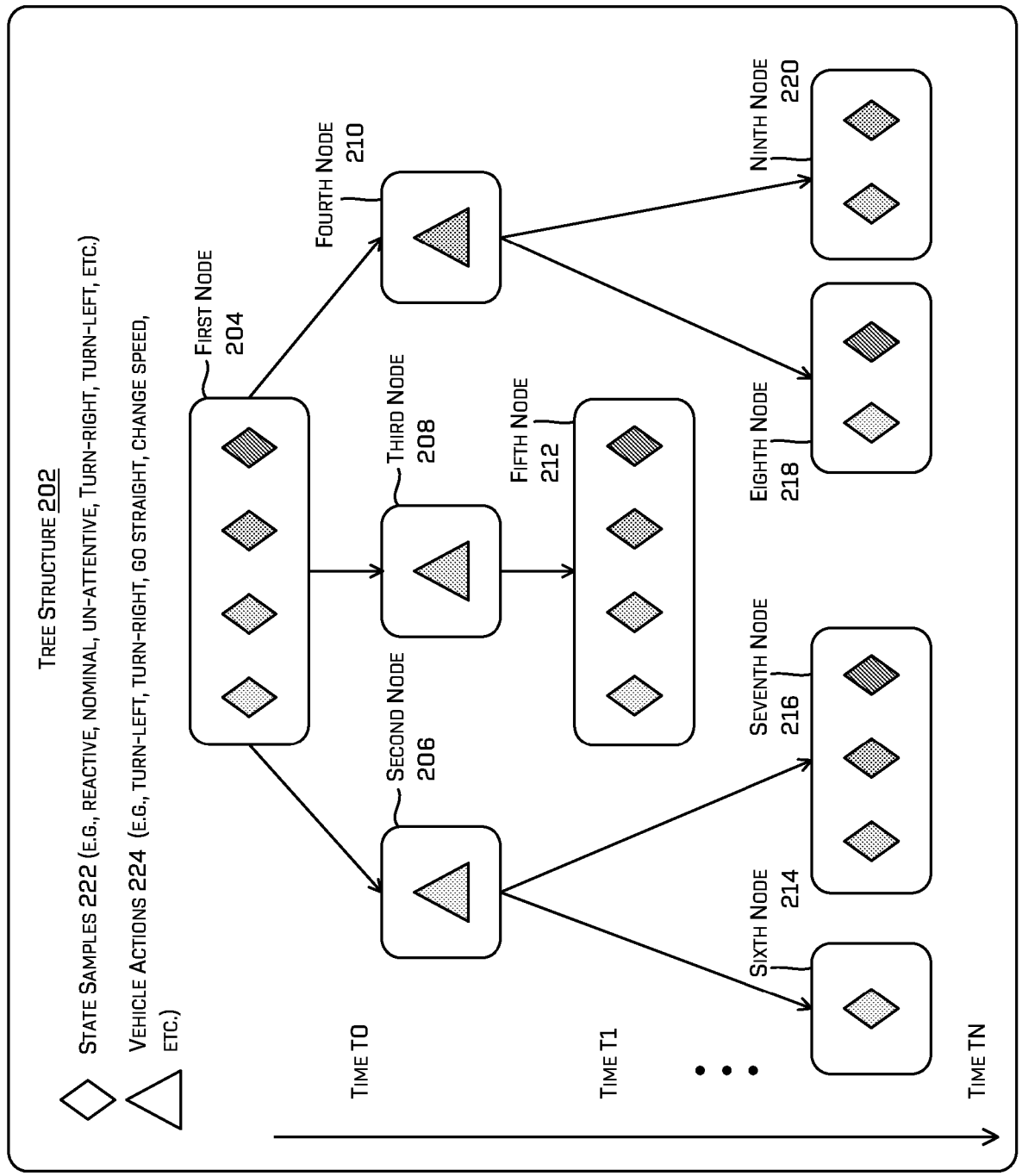
FIG. 2 provides an operational example of a tree structure that may be used to perform trajectory planning for a vehicle.

FIG. 2 provides an operational example 200 of a tree structure 202 that may be used to perform trajectory planning for a vehicle. The tree structure 202 includes one or more state nodes and one or more action nodes. A state node may be a collection of one or more state samples 222. A state sample may represent data about an object in the vehicle environment, such as a predicted object intent. Object intents can represent a level of attentiveness of the object, such as whether the object will react to the vehicle with a first level of reactiveness or a second level of reactiveness, or in some cases, not react to the vehicle during a sample. In various examples, different levels of reactiveness can be associated with different maximum thresholds for the object to accelerate, brake, or steer. The object intent can include, for example, one or more of: a) a reactive intent in which an object changes lanes, brakes, accelerates, decelerates, etc. relative to the vehicle, b) a nominal intent in which the object changes lanes, brakes, accelerates, decelerates, etc. less aggressively than the reactive intent such as decelerate to allow the vehicle to lane change, c) an un-attentive intent in which the object refrains from reacting to the vehicle, d) a right turn intent, e) a left turn intent, f) a straight intent, g) an accelerating intent, h) a decelerating intent, i) a parking intent, j) a remain in place intent, etc.). The action nodes may correspond to a set of actions 224 (e.g., a turning action, braking action, acceleration action such as yielding to or slowing for an object to safely enter in front of the vehicle). In at least some examples, such actions may comprise alternative trajectories and the nodes may specify which of the action trajectories should be tracked (used as a reference for motion) at a given point in time associated with the node.

In some examples, the object intents corresponding to the state samples of the tree structure 202 can be associated with a most relevant object(s) to the vehicle. For example, the system may receive one or more objects determined to be relevant to the vehicle by another machine learned model configured to identify a relevant object from among a set of objects in an environment of the vehicle. The machine learned model can determine the relevant object based at least in part on a relevancy score associated with each object in the set of objects and/or object(s) within a threshold distance from the vehicle. Additional examples of determining relevance of an object are described in U.S. patent application Ser. No. 16/530,515, filed on Aug. 2, 2019, entitled "Relevant Object Detection," Ser. No. 16/417,260, filed on May 30, 2019, entitled "Object Relevance Determination," and Ser. No. 16/389,720, filed on May 6, 2019, entitled "Dynamic Object Relevance Determination," all of which are incorporated herein by reference in their entirety and for all purposes.

In some examples, a state node(s) of the tree structure 202 can be associated with one or more regions surrounding the vehicle (e.g., a region most likely to include a potential intersection point with an object). For example, the system can receive one or more regions determined by a model configured to identify a relevant region from among a set of regions in the environment of the vehicle. For instance, the tree structure can include node(s) to represent an occluded region, a region in front of the vehicle, or other area within a predetermined distance of the vehicle. In some examples, the vehicle is a bi-directional vehicle, and as such, the model can define, identify, or otherwise determine the rear region relative to a direction of travel as the vehicle navigates in the environment. For instance, the rear region of the vehicle can change depending upon the direction of travel. In at least some examples, the environment may be encoded as a vector representation and output from a machine learned model as an embedding. Such an embedding may be used in predicting the future state(s) or intent(s) of the object.

The tree structure 202 includes a first node 204, a second node 206, a third node 208, a fourth node 210, a fifth node 212, a sixth node 214, a seventh node 216, an eighth node 218, and a ninth node 220, though other number of nodes are possible. For instance, the first node 204 can include four different object intents as depicted by different shading. The second node 206, the third node 208, and the fourth node 210 can be associated with corresponding vehicle actions (e.g., a proposed action or action for the vehicle to take in the future). In various examples, the second node 206, the third node 208, and/or the fourth node 210 can represent actions for applying to the vehicle over a period of time.

In the example illustrated, intents grouped together may either elicit a similar or same response from the vehicle and/or have substantially similar probabilities/confidences/likelihoods of occurrence. As illustrated, taking certain actions by the vehicle may aid in differentiating a response of the object as illustrated by varying groupings of object intents in response to vehicle actions. Further differentiation of the object intents may, in some instances, yield better responses by the vehicle to the environment (e.g., safer, more efficient, more comfortable, etc.).

The tree structure 202 is associated with a period of time as shown in FIG. 2. For example, time T0 represents a first time of the tree structure 202 and is generally associated with the first node 204 and the second node 206. Each progression of the tree structure 202 to a new node does not necessarily imply a new time (e.g., T0, T1, etc. is not scaled to the nodes in FIG. 2 but used to show a progression of time generally). In some examples, each layer of the tree structure can be associated with a particular time (e.g., the first node 204, the second node 206, the third node 208, and the fourth node 210 are associated with time T0, the fifth node 212, the sixth node 214, the seventh node 216, the eighth node 218, and the ninth node 220 are associated with time T1, and so on for additional branches or nodes (not shown) up to time TN, where N is an integer. In various examples, different layers, branches, or nodes can be associated with different times in the future. In various examples, scenarios associated with one or more of the nodes of the tree structure 202 can run in parallel on one or more processors (e.g., Graphics Processing Unit (GPU) and/or Tensor Processing Unit (TPU), etc.).

In some examples, at time T1 the vehicle takes an action associated with the third node 208 at the fifth node 212, followed by additional scenarios to test how the vehicle responds to the four object intents of the fifth node 212. Thus, the fifth node 212 can represent multiple scenarios over a time period. Further, the tree structure 202 can represent a vehicle action associated with the second node 206, and perform additional tests at time T1 to determine how the vehicle responds to the object intent of the sixth node 214 (e.g., turn left intent) and the three object intents of the seventh node 216. In some examples, the three object intents of the seventh node 216 can include a same outcome, such as the object having a straight intent but each straight intent may be associated with different levels of response to the vehicle (e.g., different velocities, accelerations, and/or braking capabilities). In various examples, the sixth node 214 (or another node having a single object intent) enables evaluation of a specific object intent (e.g., a left turn that is less likely to occur that, for example, the object continuing straight and not turning left) on the vehicle trajectory determination.

In various examples, a different vehicle action at the fourth node 210 can cause additional tests (scenarios) to be performed to determine how the vehicle responds to the two object intents of the eighth node 218 and the two object intents of the ninth node 220.

Note that in the depicted example in FIG. 2, the nodes after the vehicle actions in time (e.g., nodes 206, 208, and 210) can be considered sub-nodes, or child nodes, and the total number of object intents between sub-nodes equals an amount of object intents in the first node 204. For example, the sixth node 214 and the seventh node 216 have four object intents combined, which is equal to the four object intents of the first node 204. In other examples, however, the object intents can change between nodes and the number of object intents can also vary by node (e.g., may be more or less than the number of object intents in the first node of the tree structure).

In some examples, additional nodes (not shown) can be searched in the tree structure 202 to test another object intent or group of object intents. For example, at time T2, a new set of samples and/or a new set of object intents can be associated with a node of the tree structure 202 based at least in part on an output of a previous node. In some examples, a new combination of object intents can be assigned to a node by a model to further consider different object actions when determining a vehicle trajectory. By receiving a new set of samples different from the set of samples used in previous nodes, nodes of the tree structure 202 can be "re-sampled" dynamically during a tree search, for example.

In various examples, the system can generate the tree structure 202 based at least in part on one or more of: an attribute (e.g., position, velocity, acceleration, yaw, etc.) of the objects, history of the objects (e.g., location history, velocity history, etc.), an attribute of the vehicle (e.g., velocity, position, etc.), and/or features of the environment (e.g., roadway boundary, roadway centerline, crosswalk permission, traffic light permission, and the like). In some examples, a node of the tree structure 202 can be associated with various costs (e.g., comfort cost, safety cost, distance cost, brake cost, obstacle cost, etc.) usable for determining a potential intersection point between the vehicle and the object in the future.

Figure 3:
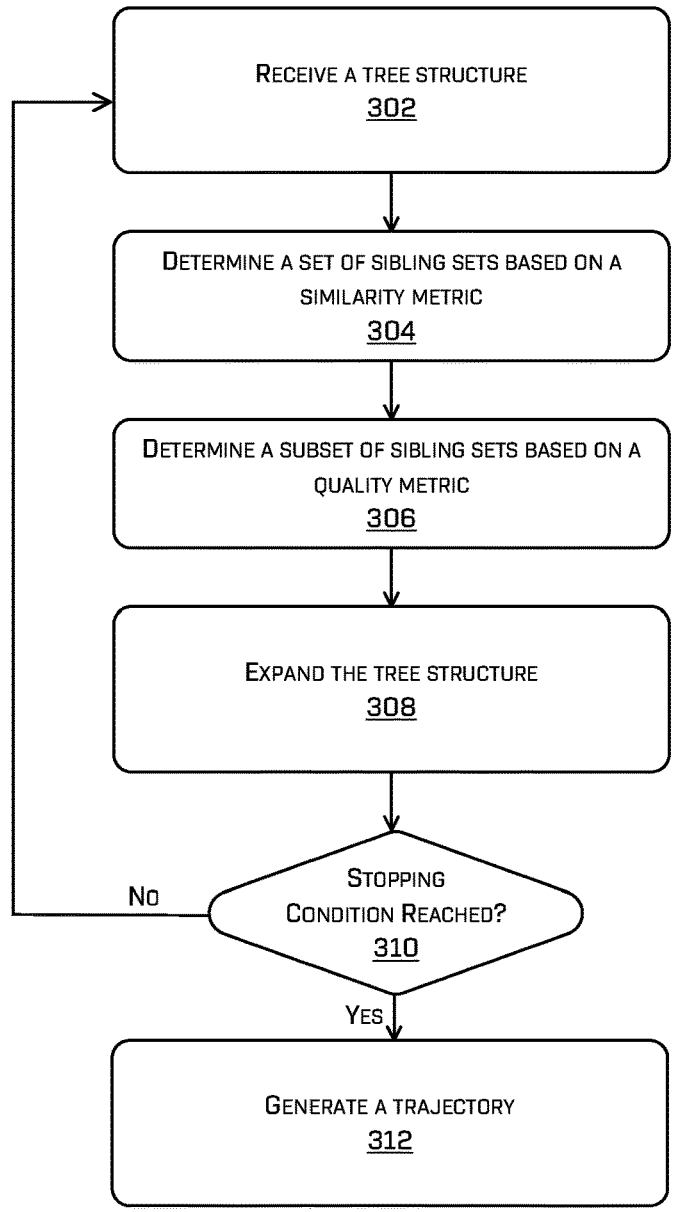
FIG. 3 is a flowchart diagram of an example process for iteratively and selectively expanding a tree structure.

FIG. 3 is a flowchart diagram of an example process 300 for iteratively and selectively expanding a tree structure. As depicted in FIG. 3, at operation 302, an example system receives a tree structure. In some cases, during the initial iteration, the tree structure received at operation 302 includes a single state node (e.g., a root node, such as the root node corresponding to the current state of the environment). In some cases, during each iteration after the initial iteration, the tree structure received at operation 302 includes the expanded tree structure generated by the preceding iteration.

At operation 304, the system determines a set of sibling state sets in the tree structure based on a similarity metric. In some cases, a sibling state set is the collection of all states that are predicted to result from performing a particular action at a particular initial state. In some cases, two sibling state sets are included in the set determined at operation 304 if those two sibling state sets are determined to be similar (e.g., if the similarity score associated with the two sets exceeds a threshold). In some cases, two sibling state sets are included in the set determined at operation 304 if those two sibling state sets are either determined to be similar or if they are connected to each other via a chain of similarities (e.g., set A and set B may be determined to be similar if A is similar to set C and B is similar to set C).

At operation 306, the system determines a subset of the sibling state sets determined at operation 304 based on a quality metric. performs the following operations: (i) for each pair of state sibling sets including two similar sets, determine which set in the pair has a higher quality score and mark that set as "not removable," and (ii) expand the tree structure using all state sibling sets that are marked "not removable." In some cases, after determining that a set of state sibling sets are similar, the example system uses a directed graph (e.g., a directed acyclic graph) to determine a subset of the similar sets for expansion.

At operation 308, the system expands the tree structure. In some cases, expanding the tree structure includes expanding the tree structure based on actions that may be performed at the states associated with the subset. In some cases, expanding the tree structure includes refraining to expand the tree structure based on actions that may be performed at the states associated with state sibling sets that fall outside the subset. In some cases, after a set of states are determined to be similar, a subset of that set is determined based on a quality metric are selected. Accordingly, the set of similar states includes a quality subset and a non-quality subset. In some cases, the states in the non-quality subset are marked as ineligible for expansion and thus not expanded. In some cases, the quality subset may be further refined based on one or more other criteria for determining whether a state is ineligible for expansion. In some cases, the states in the quality subset are stored in a queue (e.g., with other states that are determined to be eligible for expansion), where the ordering of the queue may be determined based on quality scores associated with the states in the queue. In some cases, the states in the queue are expanded in accordance with their position in the queue and given an available processing capacity and/or time. Accordingly, a state in the queue may in some cases remain unexpended if available processing capacity and/or time is exhausted before the state is selected from the queue.

At operation 310, the system determines whether a stopping condition is reached. For example, the system may continue expanding the tree by exploring the next highest quality state sibling sets until a set maximum tree depth is reached. As another example, the system may continue expansion until a solution trajectory with a cost meeting specified criteria is discovered.

At operation 312, based on (e.g., in response to) determining that a stopping condition is reached (operation 310—Yes), the system generates a trajectory based on the expanded tree structure. In some cases, after the tree structure is expanded until the stopping condition is reached, the resulting structure is used to determine costs for one or more candidate trajectories. In some cases, based on (e.g., in response to) determining that a stopping condition is not reached (operation 310—No), the system returns to operation 302 to perform another iteration of tree structure expansion, this time using the expanded tree structure generated at operation 308.

Figure 4:
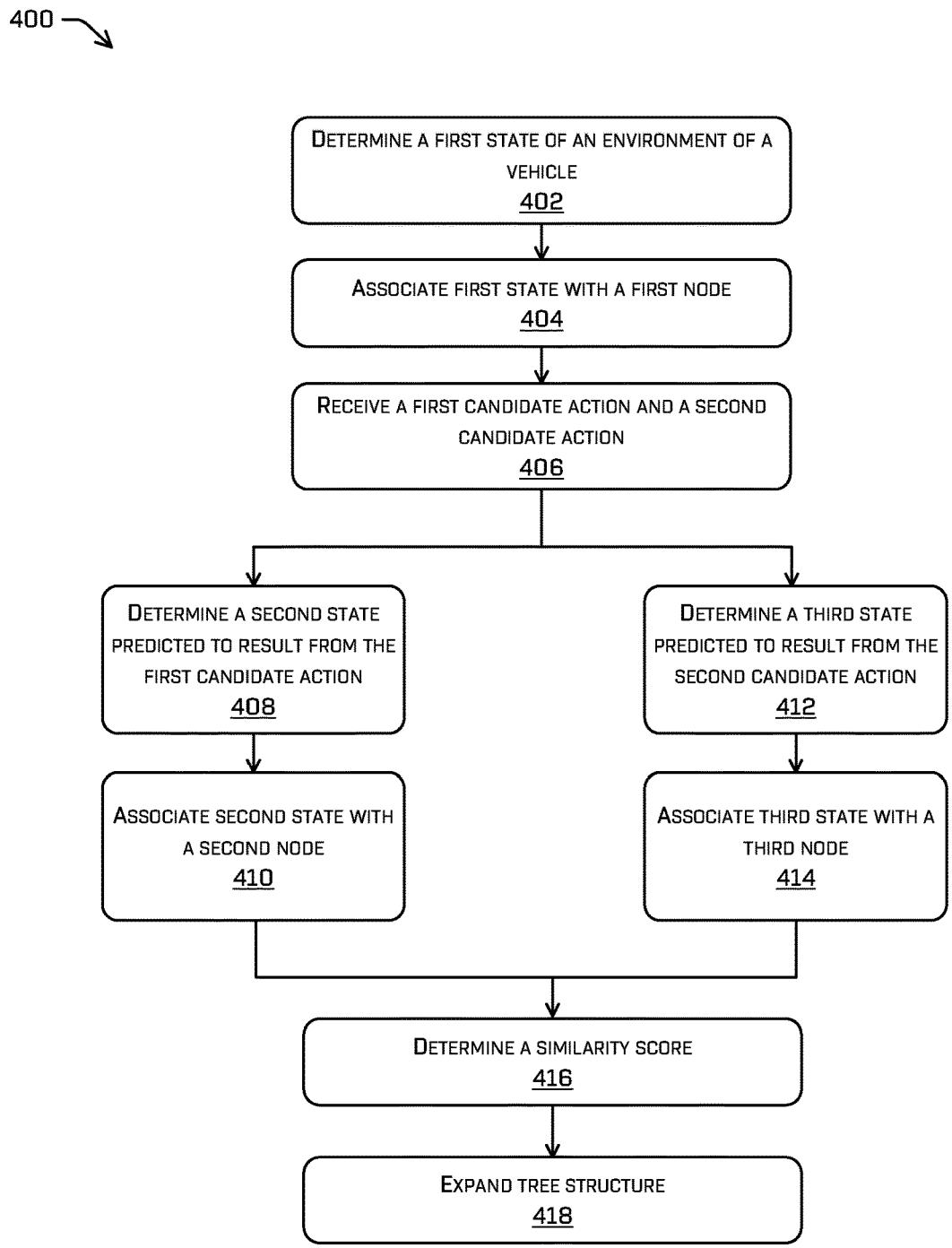
FIG. 4 is a flowchart diagram of an example process for generating a tree structure using a selective expansion technique.

FIG. 4 is a flowchart diagram of an example process 400 for generating a tree structure using a selective expansion technique. As depicted in FIG. 4, at operation 402, an example system determines a first state of an environment of a vehicle. The first state may be a current state of the environment, such as a current state determined based on sensor data captured by one or more sensors associated with the vehicle.

At operation 404, the system associates the first state with a first node of a tree structure. The first node may be a root node of the tree structure.

At operation 406, the system receives a first candidate action and a second candidate action that are available to the vehicle at the first state. The first and second candidate actions may be actions defined for the vehicle at the current state. Examples of candidate actions include a left-turn action, a right-turn action, a go-straight action, a stopping action, and a change-speed action.

At operation 408, the system determines a second predicted state of the environment that is predicted to result from performing the first candidate action at the first state. The second state may be determined using a machine learning model and/or a simulation model.

At operation 410, the system associates the second predicted state with a second node of the tree structure. In some cases, the second node is a state node that depends from an action node corresponding to the first candidate action.

At operation 412, the system determines a third predicted state of the environment that is predicted to result from performing the second candidate action at the first state. The third state may be determined using a machine learning model and/or a simulation model.

At operation 414, the system associates the third predicted state with a third node of the tree structure. In some cases, the third node is a state node that depends from an action node corresponding to the second candidate action. As depicted in FIG. 4, at least one of operations 412 or 414 may be performed in parallel with at least one of operations 408 or 410.

At operation 416, the system determines a similarity score associated with the second predicted state and the third predicted state. In some cases, to determine whether the second predicted state and the third predicted state are similar, the system uses at least one of the following: (i) the counts of state samples associated with each of the two states, or (ii) the degree of similarity between the state samples of the second predicted state and the state samples of the third predicted state.

In some cases, the similarity score is determined based on a similarity score between a sibling state set that includes the second predicted state and a sibling state set that includes the third predicted state. In some cases, to determine whether a first state sibling set and a second state sibling set are similar, the system uses at least one of the following: (i) the counts of states associated with each of the two state sibling sets, (ii) the counts of state samples associated with each of the two state sibling sets, or (iii) the degree of similarity between the state samples of the first state sibling set and the state samples of the second state sibling set.

At operation 418, the system expands the tree structure based on the similarity score. For example, in some cases, the system determines whether the similarity score exceeds a threshold. In some cases, the system determines that the similarity score exceeds a threshold if: (i) the second predicted state and the third predicted state have a similar (e.g., an equal) number of state samples, and (ii) a measure of similarity associated with the state samples of the second predicted state and the states samples of the second predicted state exceeds a threshold. In some cases, the system determines that the similarity score exceeds a threshold if, given a first state sibling set that includes the second predicted state and a second sibling set that includes the third predicted state node: (i) the two state sibling sets include a similar (e.g., an equal) number of states, (ii) the states associated with the two state sibling sets include a similar (e.g., an equal) number of state samples, and (iii) a measure of similarity associated with the state samples of the first state sibling set and the states samples of the state sibling set exceeds a threshold. In some cases, the system expands the tree based on whether the similarity score exceeds a threshold. For example, the similarity score and threshold may be used to determine a set of states that are determined to be similar. In some cases, after a set of states are determined to be similar, a subset of that set is determined based on a quality metric are selected. Accordingly, the set of similar states includes a quality subset and a non-quality subset. In some cases, the states in the non-quality subset are marked as ineligible for expansion and thus not expanded. In some cases, the quality subset may be further refined based on one or more other criteria for determining whether a state is ineligible for expansion. In some cases, the states in the quality subset are stored in a queue (e.g., with other states that are determined to be eligible for expansion), where the ordering of the queue may be determined based on quality scores associated with the states in the queue. In some cases, the states in the queue are expanded in accordance with their position in the queue and given an available processing capacity and/or time. Accordingly, a state in the queue may in some cases remain unexpended if available processing capacity and/or time is exhausted before the state is selected from the queue.

Figure 5:
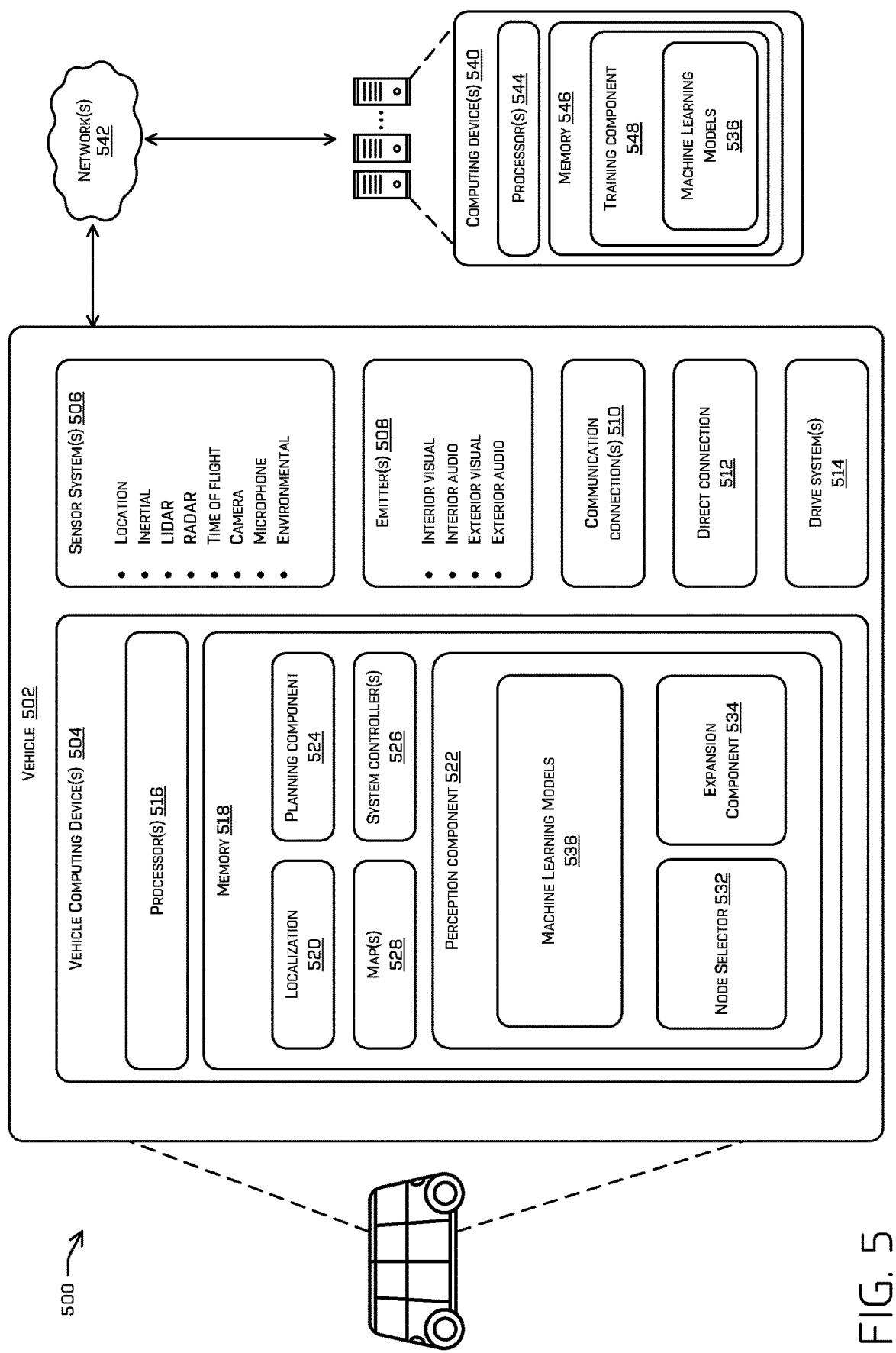
FIG. 5 depicts a block diagram of an example system for implementing the techniques described herein.

FIG. 5 depicts a block diagram of an example system 500 for implementing the techniques described herein. In at least one example, the system 500 may include a vehicle 502.

The vehicle 502 may include a vehicle computing device 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, and one or more maps 528. Though depicted in FIG. 5 as residing in memory 518 for illustrative purposes, it is contemplated that the localization component 520, the perception component 522, the planning component 524, the one or more system controllers 526, and the one or more maps 528 may additionally, or alternatively, be accessible to the vehicle 502 (e.g., stored remotely).

In at least one example, the localization component 520 may include functionality to receive data from the sensor system(s) 506 to determine a position of the vehicle 502. For example, the localization component 520 may include and/or request/receive a three-dimensional map of an environment and may continuously determine a location of the autonomous vehicle within the map. In some instances, the localization component 520 may utilize SLAM (simultaneous localization and mapping) or CLAMS (calibration, localization and mapping, simultaneously) to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for generating a candidate trajectory.

In some instances, the perception component 522 may include functionality to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, building, tree, road surface, curb, sidewalk, unknown, road feature, etc.). In examples, the perception component 522 may process sensor data to identify a road feature (e.g., an intersection, parking lane, signal light, stop sign, etc.), determine a proximity of the road feature to the vehicle 502, and/or provide data regarding the road feature (e.g., proximity, etc.) as processed sensor data. In additional and/or alternative examples, the perception component 522 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may be a sequence of waypoints for travelling between two locations. As non-limiting examples, waypoints include streets, intersections, GPS coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In examples, the planning component 524 may include a node selector 532 that is configured to determine which nodes of a tree structure to expand during trajectory planning. In examples, the planning component 524 may include a set of machine learning models 536 that may be executed to expand the selected nodes by determining predicted states resulting from simulation of different actions in different initial states. In examples, the planning component 524 may include an expansion component 534 that is configured to perform selective expansion of a decision tree based on nodes selected by the node selector 532 and predicted states generated by the machine learning models 536.

In at least one example, the one or more system controllers 526 may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include the one or more maps 528 that may be used by the vehicle 502 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 528 may be divided into tiles by the vehicle computing device 504, by a computing device(s) 540, or by a combination of the two.

In some examples, the one or more maps 528 may be stored on a remote computing device(s) (such as the computing device(s) 540) accessible via network(s) 542. In some examples, multiple maps 528 may be stored based on, for example, a characteristic (e.g., type of entity, time of day, day of week, season of the year, etc.). Storing multiple maps 528 may have similar memory requirements, but increase the speed at which data in a heat map may be accessed.

In some instances, aspects of some or all of the components discussed herein may include any models, algorithms, and/or machine learning algorithms. For example, in some instances, the components in the memory 518 may be implemented as a neural network.

As described herein, an exemplary neural network passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, and/or alternatively, the sensor system(s) 506 may send sensor data, via the one or more networks 542, to the one or more computing device(s) 540 at a particular frequency, after a lapse of a predetermined period of time, in near real-time, etc.

The vehicle 502 may also include the one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 may also include the one or more communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., other nearby vehicles, traffic signals, etc.). The communication connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as the network(s) 542. For example, the communications connection(s) 510 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include the one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 also include one or more communication connection(s) that enable communication by the respective drive module with one or more other local or remote computing device(s).

In at least one example, the localization component 520, perception component 522, and/or the planning component 524 may process sensor data, as described above, and may send their respective outputs, over the one or more network(s) 542, to the one or more computing device(s) 540. In at least one example, the localization component 520, the perception component 522, and/or the planning component 524 may send their respective outputs to the one or more computing device(s) 540 at a particular frequency, after a lapse of a predetermined period of time, in near real-time, etc.

The vehicle 502 may send sensor data to the one or more computing device(s) 540, via the network(s) 542. In some examples, the vehicle 502 may send raw sensor data to the computing device(s) 540. In other examples, the vehicle 502 may send processed sensor data and/or representations of sensor data to the computing device(s) 540. In some examples, the vehicle 502 may send sensor data to the computing device(s) 540 at a particular frequency, after a lapse of a predetermined period of time, in near real-time, etc. In some cases, the vehicle 502 may send sensor data (raw or processed) to the computing device(s) 540 as one or more log files. The computing device(s) 540 may receive the sensor data (raw or processed) and may generate and/or update maps based on the sensor data.

In examples, the vehicle 502 may generate various log file(s) representing sensor data captured by the vehicle 502. For example, a log file may include, but is not limited to, sensor data captured by one or more sensors of the vehicle 502 (e.g., lidar sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 502, decisions made by the vehicle 502, determinations made regarding segmentation and/or classification, and the like. A log files(s) may be sent to and received by the computing device(s) 540.

In at least one example, the computing device(s) 540 may include one or more processors 544 and memory 546 communicatively coupled with the one or more processors 544. In the illustrated example, the memory 546 stores a training component 548 that may train the machine learning model 536 according to any of the techniques discussed herein. The training component 548 may train the machine learning model 536 at any time, such as while offline, and then send the machine learning model 536 to the vehicle 502 over the network(s) 542 to be implemented by the vehicle 502. In some cases, once trained, the machine learning model 536 is deployed on the vehicle computing device 504, and operations of the machine learning model 536 are performed by the vehicle computing device 504. In some cases, once trained, the machine learning model 536 is deployed on the computing device 540, operations of the machine learning model 536 are performed by the computing device 540 to generate model output data, and then model output data are transmitted to the perception component 522 of the vehicle computing device 504.

Although illustrated as being implemented on the computing device(s) 540, the training component 548 may be implemented on the vehicle 502, such as stored within the memory 518 of the vehicle computing device 504 and executed by the processor(s) 516 of the vehicle computing device 504. Further, any of the components of the vehicle computing device(s) 504 may alternatively, or additionally, be implemented by the computing device(s) 540.

The processor(s) 516 of the vehicle 502 and the processor(s) 544 of the computing device(s) 540 may be any suitable processor capable of executing instructions to process data and perform operations as described herein. By way of example and not limitation, the processor(s) 516 and 544 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 546 are examples of non-transitory computer-readable media. Memory 518 and memory 546 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 540 and/or components of the computing device(s) 540 may be associated with the vehicle 502. That is, the vehicle 502 may perform one or more of the functions associated with the computing device(s) 540, and vice versa.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: determining a first state of an environment of an autonomous vehicle; associating the first state of the environment with a first node of a tree structure; receiving a first candidate action and a second candidate action for the autonomous vehicle to perform; determining a second state of the environment predicted to result from the autonomous vehicle performing the first candidate action; associating the second state with a second node of the tree structure along a first branch; determining a third state of the environment predicted to result from the autonomous vehicle performing the second candidate action; associating the third state with a third node of the tree structure along a second branch; determining a similarity score of the second node and the third node; based at least in part on the similarity score, one of: expanding the tree structure along the second node, or refraining from expanding the tree structure along the second node; determining, based at least in part on the tree structure, a trajectory for the autonomous vehicle; and controlling the autonomous vehicle based on the trajectory.

B: The system of paragraph A, wherein the operations further comprise: determining a first quality score associated with the second node; and determining a second quality score associated with the third node, wherein determining the trajectory is further based at least in part on the first quality score and the second quality score.

C: The system of paragraph B, wherein determining the first quality score comprises determining at least one of: a first estimate of a cost associated with traversing the trajectory from the second node, a second estimate of a number of states resulting from expanding tree structure from the second node, or a first value representing a measure of deviation between the first candidate action and a policy associated with the autonomous vehicle.

D: The system of any of paragraphs A-C, wherein determining the similarity score comprises one or more of: iterating through pairs of nodes of the tree structure, or determining a directed graph comprising a directed edge between two similar nodes whose direction is determined based on quality scores associated with the two similar nodes.

E: The system of paragraph D, wherein the operations further comprise determining that the similarity score exceeds a threshold similarity score.

F: A method comprising: associating a first state of an environment with a first node of a tree structure; associating, based at least a first candidate action for a vehicle to perform, a second predicted state of the environment with a second node of the tree structure; associating, based at least a second candidate action for the vehicle to perform, a third predicted state of the environment with a third node of the tree structure; determining a similarity score of the second node and the third node; expanding the tree structure based on the similarity score; and controlling the vehicle based on the tree structure.

G: The method of paragraph F, further comprising determining a quality score, and wherein expanding the tree structure is further based at least in part on the quality score.

H: The method of paragraph G, wherein determining the quality score comprises determining at least one of: a first estimate of a cost associated with traversing a trajectory through the second node and to a final time, a second estimate of a number of states resulting from expanding tree structure from the second node, or a first value representing a measure of deviation between the first candidate action and a policy associated with the vehicle.

I: The method of any of paragraphs F-H, further comprising: based on determining that the similarity score exceeds a threshold score, refraining from expanding the second node.

J: The method of any of paragraphs F-I, further comprising: determining a first quality score associated with the second node; and determining a second quality score associated with the third node, wherein expanding the tree structure is further based at least in part on the first quality score and the second quality score.

K: The method of any of paragraphs F-J, wherein determining the similarity score comprises one or more of: iterating through pairs of nodes of the tree structure, or determining a directed graph comprising a directed edge between two similar nodes whose direction is determined based on quality scores associated with the two similar nodes.

L: The method of any of paragraphs F-K, wherein determining the similarity score comprises: determining a sink node of a graph comprising a directed edge representing an order relationship associated with a pair of states.

M: The method of any of paragraphs F-L, wherein determining the similarity score comprises: determining that the second predicted state represents a first set of state samples, wherein the first set of state samples represent an intent associated with a first object in the environment; determining that the third predicted state represents a second set of state samples; and determining the similarity score based on a first count associated with the first set of state samples and a second count associated with the second set of state samples.

N: The method of any of paragraphs F-M, wherein expanding the tree structure comprises: associating, based at least the first candidate action, a fourth predicted state of the environment with a fourth node of the tree structure; and expanding the tree structure based on the second predicted state and the fourth predicted state.

O: One or more non-transitory computer-readable media storing instructions executable by one or more processors, wherein the instructions, when executed, cause the one or more processors to perform operations comprising: associating a first state of an environment with a first node of a tree structure; associating, based at least a first candidate action for a vehicle to perform, a second predicted state of the environment with a second node of the tree structure; associating, based at least a second candidate action for the vehicle to perform, a third predicted state of the environment with a third node of the tree structure; determining a similarity score of the second node and the third node; expanding the tree structure based on the similarity score; and controlling the vehicle based on the tree structure.

P: The one or more non-transitory computer-readable media of paragraph O, the operations further comprising determining a quality score, and wherein expanding the tree structure is further based at least in part on the quality score.

Q: The one or more non-transitory computer-readable media of paragraph P, wherein determining the quality score comprises determining at least one of: a first estimate of a cost associated with traversing a trajectory through the second node and to a final time, a second estimate of a number of states resulting from expanding tree structure from the second node, or a first value representing a measure of deviation between the first candidate action and a policy associated with the vehicle.

R: The one or more non-transitory computer-readable media of any of paragraphs O-Q, wherein: based on determining that the similarity score meets or is below a threshold score, expanding the tree structure by expanding the second node and the third node; or based on determining that the similarity score exceeds the threshold score, refraining from expanding the second node.

S: The one or more non-transitory computer-readable media of any of paragraphs O-R, the operations further comprising: determining a first quality score associated with the second node; and determining a second quality score associated with the third node, wherein expanding the tree structure is further based at least in part on the first quality score and the second quality score.

T: The one or more non-transitory computer-readable media of any of paragraphs O-S, wherein determining the similarity score comprises one or more of: iterating through pairs of nodes of the tree structure, or determining a directed graph comprising a directed edge between two similar nodes whose direction is determined based on quality scores associated with the two similar nodes.

What is claimed is:

1. A system comprising:
one or more processors; and
one or more non-transitory computer-readable media storing computer-executable instructions that, when executed, cause the one or more processors to perform operations comprising:
determining a first state of an environment of an autonomous vehicle;
associating the first state of the environment with a first node of a tree structure;
receiving a first candidate action and a second candidate action for the autonomous vehicle to perform;
determining a second state of the environment predicted to result from the autonomous vehicle performing the first candidate action;
associating the second state with a second node of the tree structure along a first branch;
determining a third state of the environment predicted to result from the autonomous vehicle performing the second candidate action;
associating the third state with a third node of the tree structure along a second branch;

determining a similarity score of the second node and the third node, wherein determining the similarity score comprises: determining a sink node of a graph comprising a directed edge representing an order relationship associated with a pair of states;
based at least in part on the similarity score, one of:
expanding the tree structure along the second node, or
refraining from expanding the tree structure along the second node;
determining, based at least in part on the tree structure, a trajectory for the autonomous vehicle; and
controlling the autonomous vehicle based on the trajectory.

2. The system of claim 1, wherein the operations further comprise:
determining a first quality score associated with the second node; and
determining a second quality score associated with the third node, wherein determining the trajectory is further based at least in part on the first quality score and the second quality score.

3. The system of claim 2, wherein determining the first quality score comprises determining at least one of:
a first estimate of a cost associated with traversing the trajectory from the second node,
a second estimate of a number of states resulting from expanding the tree structure from the second node, or
a first value representing a measure of deviation between the first candidate action and a policy associated with the autonomous vehicle.

4. The system of claim 1, wherein determining the similarity score further comprises one or more of:
iterating through pairs of nodes of the tree structure, or
determining a directed graph comprising a directed edge between two similar nodes whose direction is determined based on quality scores associated with the two similar nodes.

5. The system of claim 4, wherein the operations further comprise determining that the similarity score exceeds a threshold similarity score.

6. A method comprising:
associating a first state of an environment with a first node of a tree structure;
associating, based at least a first candidate action for a vehicle to perform, a second predicted state of the environment with a second node of the tree structure;
associating, based at least a second candidate action for the vehicle to perform, a third predicted state of the environment with a third node of the tree structure;
determining a similarity score of the second node and the third node, wherein determining the similarity score comprises: determining a sink node of a graph comprising a directed edge representing an order relationship associated with a pair of states;
expanding the tree structure based on the similarity score; and
controlling the vehicle based on the tree structure.

7. The method of claim 6, further comprising determining a quality score, wherein expanding the tree structure is further based at least in part on the quality score.

8. The method of claim 7, wherein determining the quality score comprises determining at least one of:
a first estimate of a cost associated with traversing a trajectory through the second node and to a final time,
a second estimate of a number of states resulting from expanding the tree structure from the second node, or
a first value representing a measure of deviation between the first candidate action and a policy associated with the vehicle.

9. The method of claim 6, further comprising:
based on determining that the similarity score exceeds a threshold score, refraining from expanding the second node.

10. The method of claim 6, further comprising:
determining a first quality score associated with the second node; and
determining a second quality score associated with the third node, wherein expanding the tree structure is further based at least in part on the first quality score and the second quality score.

11. The method of claim 6, wherein determining the similarity score further comprises one or more of:
iterating through pairs of nodes of the tree structure, or
determining a directed graph comprising a directed edge between two similar nodes whose direction is determined based on quality scores associated with the two similar nodes.

12. The method of claim 6, wherein determining the similarity score further comprises:
determining that the second predicted state represents a first set of state samples, wherein the first set of state samples represent an intent associated with a first object in the environment;
determining that the third predicted state represents a second set of state samples; and
determining the similarity score based on a first count associated with the first set of state samples and a second count associated with the second set of state samples.

13. The method of claim 6, wherein expanding the tree structure comprises:
associating, based at least the first candidate action, a fourth predicted state of the environment with a fourth node of the tree structure; and
expanding the tree structure based on the second predicted state and the fourth predicted state.

14. One or more non-transitory computer-readable media storing instructions executable by one or more processors, wherein the instructions, when executed, cause the one or more processors to perform operations comprising:
associating a first state of an environment with a first node of a tree structure;
associating, based at least a first candidate action for a vehicle to perform, a second predicted state of the environment with a second node of the tree structure;
associating, based at least a second candidate action for the vehicle to perform, a third predicted state of the environment with a third node of the tree structure;
determining a similarity score of the second node and the third node, wherein determining the similarity score comprises: determining a sink node of a graph comprising a directed edge representing an order relationship associated with a pair of states;
expanding the tree structure based on the similarity score; and
controlling the vehicle based on the tree structure.

15. The one or more non-transitory computer-readable media of claim 14, the operations further comprising determining a quality score, and wherein expanding the tree structure is further based at least in part on the quality score.

16. The one or more non-transitory computer-readable media of claim 15, wherein determining the quality score comprises determining at least one of:

a first estimate of a cost associated with traversing a trajectory through the second node and to a final time, a second estimate of a number of states resulting from expanding the tree structure from the second node, or a first value representing a measure of deviation between the first candidate action and a policy associated with the vehicle.

17. The one or more non-transitory computer-readable media of claim 14, wherein:

based on determining that the similarity score meets or is below a threshold score, expanding the tree structure by expanding the second node and the third node; or based on determining that the similarity score exceeds the threshold score, refraining from expanding the second node.

18. The one or more non-transitory computer-readable media of claim 14, the operations further comprising:

determining a first quality score associated with the second node; and determining a second quality score associated with the third node, wherein expanding the tree structure is further based at least in part on the first quality score and the second quality score.

19. The one or more non-transitory computer-readable media of claim 14, wherein determining the similarity score further comprises one or more of:

iterating through pairs of nodes of the tree structure, or determining a directed graph comprising a directed edge between two similar nodes whose direction is determined based on quality scores associated with the two similar nodes.

* * * * *